UNITED STATES PATENT OFFICE.

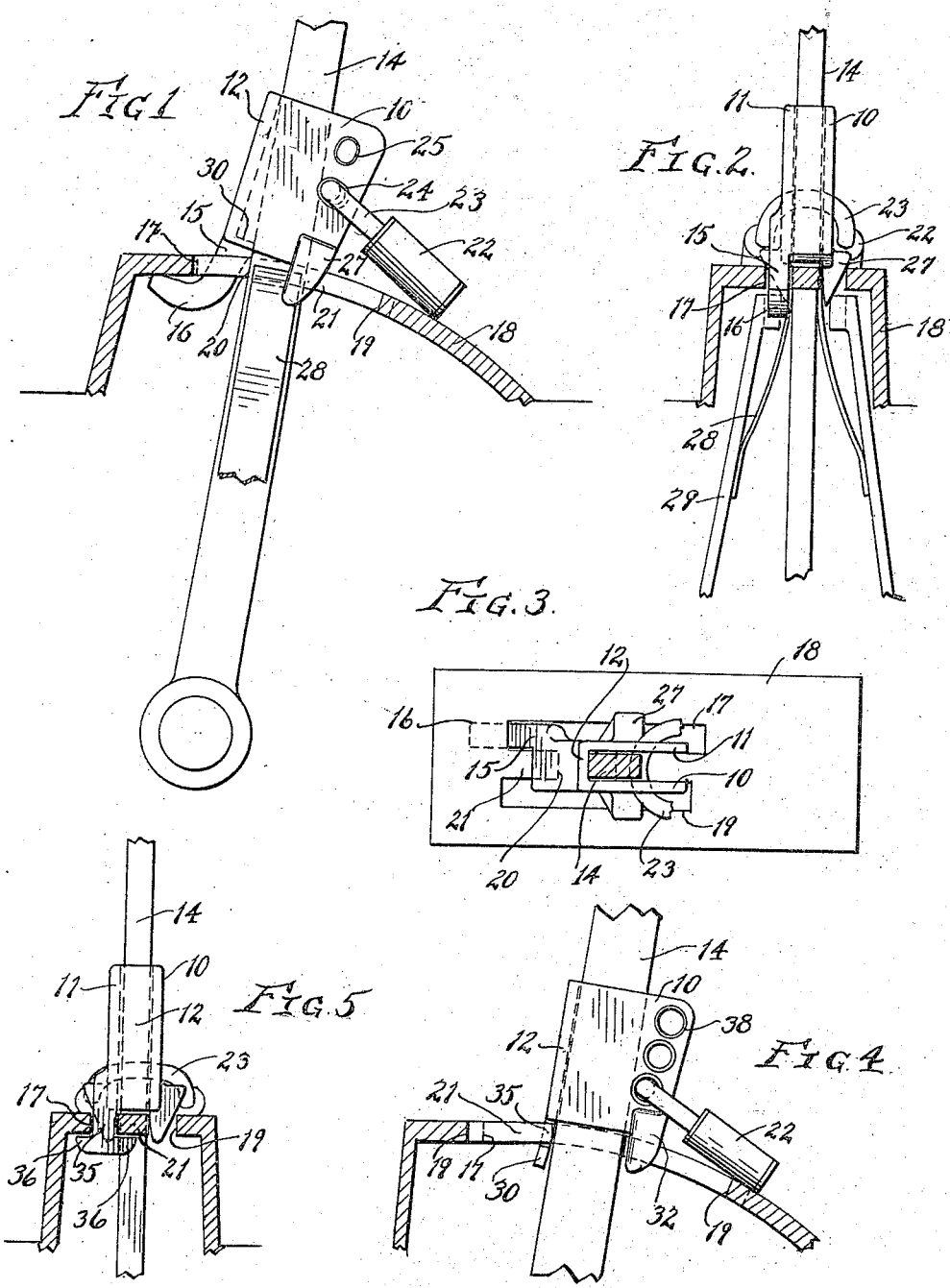

GEORGE T. TRUNDLE, JR., OF CLEVELAND, OHIO.

AUTOMOBILE-LOCK.

1,167,952.

Specification of Letters Patent.

Patented Jan. 11, 1916.

Application filed January 29, 1915. Serial No. 4,987.

*To all whom it may concern:*

Be it known that I, GEORGE T. TRUNDLE, Jr., a citizen of the United States, residing at Cleveland, in the county of Cuyahoga and State of Ohio, have invented a certain new and useful Improvement in Automobile-Locks, of which the following is a full, clear, and exact description, reference being had to the accompanying drawings.

The general object of my invention is to provide a simple, efficient device for preventing the theft of automobiles.

A more specific object is to provide such a device which may be very conveniently applied to the usual shift lever controlling the transmission gearing for locking these parts in their neutral position, preventing the vehicle being driven by its motor.

Another object is to so arrange the device that it may be applied to a wide variety of existing automobiles without (in any case), necessitating any change of the parts to which it is applied.

My invention is particularly designed to engage the shift lever for the transmission gearing and the guide slot of the lever, in order to hold it in a neutral position.

The invention is hereinafter more fully described in connection with the drawings and the essential characteristics are set forth in the claims.

Figure 1 is a side elevation of my locking device, showing sectional details of the transmission gearing shift lever and its slotted guide plate; Fig. 2 is an edge elevation of the same, and Fig. 3 is a plan of the same; Fig. 4 is a side elevation of a modified form of my device mounted in position; Fig. 5 is an edge elevation of the same.

My device comprises a member having sides 10 and 11 connected at one edge by a portion 12 forming in effect a wide clevis adapted to extend around and embrace three sides of the usual transmission gearing shift lever 14. At one side of the connection portion 12 and preferably integral therewith, is provided a downwardly extending finger 15, adapted to depend through one of the guide slots formed in the usual guiding member 18 and engage its sides. As shown in Figs. 1 to 3, this finger has a hooked end extended rearwardly at 16 for engaging the under side of the top plate adjacent to the end of the slot.

The guiding slots in the member 18 are commonly arranged as shown, there being two longitudinal parallel slots 17 and 19 connected by an intermediate passage 20, through which the lever 14 may be moved, the transmission mechanism being so arranged that when the lever is in this intermediate portion 20, it stands at neutral, that is, with the motor disconnected from the driving mechanism for the wheels. Now with the lever standing in the intermediate position, my device may be placed on the shift lever, as shown, with the hooked finger depending through the slot 17 and engaging underneath the plate 18 adjacent the end of the slot 17. The locking member may be then secured in this position by means of a suitable padlock, as shown at 22, having its bow 23 extending through registering openings 24 in the sides 10 and 11. Now, with the parts in this position, the lever cannot be shifted laterally because of the finger 15; it cannot be raised to withdraw this finger because of its hooked end 16, and it cannot be disengaged from the lever 14 because of the lock 22. To provide for varying widths of shifting levers, other registering openings may be made through the sides of the locking member, as shown at 25, at a greater or less distance from the connecting portion 12. Wedge-shaped ears 27 may be arranged on each of the side members 10 and 11 at their lower edges, adapted to extend into the slots and engage the same to further insure against lateral shifting of the lever. The inner sides of these ears are preferably flared at their lower ends so that the ears may overlap and engage centering springs 28, frequently provided on the gear shifting arms 29, with which the lever 14 co-acts. As shown, a short web 30 is formed between the lower edges of the sides adjacent to the connecting portion, abutting the edge of the lever to hold the ears in position to engage the springs, as well as causing the hook 16 to extend the desired distance beneath the top plate of the member 18. By removing a portion of this web, as by filing, the lock may be very accurately fitted to any particular lever when necessary.

In the form of my device shown in Figs. 4 and 5, the sides and connecting portion are substantially the same, but the ears 32 corresponding to the ears 27 act only to engage the sides of the slots and do not engage springs 28. A depending finger 35 corresponding to the finger 15 and similarly arranged on the device, is substantially T-shaped, having transverse projections 36 adapted to engage beneath the plate at each side of the slot. To place this form of device in position, it is only necessary to turn the locking member transversely of the slots, so that the extensions 36 may enter one of the slots, and then turn the device longitudinally so that it may be moved to a position embracing the lever 14. It may then be locked in position by a padlock, as described. In this form I have shown three sets of registering openings 38 in the side members, positioned at varying distances from the connecting portion 12, to allow for different widths of the lever.

It will be seen from the foregoing description that I have provided a device which is simple and which may be cheaply manufactured and very conveniently applied to existing automobiles, as it requires no change whatever of any of the parts with which it coöperates. When the locking device is once in position, the lever cannot be moved forwardly or backwardly because of the bridge-members 21 between the slots extending to the connecting opening 20 and engaging the lever at each edge, and it cannot be shifted laterally because of the depending fingers and wedge-shaped ears 27 and 36, and it cannot be moved upwardly to draw the finger and ears out of engagement with the slot because of the hooked portion at the lower ends of the depending fingers, while the lock prevents the removing of the device from engagement with the lever.

Having thus described my invention, what I claim is:

1. The combination, with a gear shift lever and a guide plate having a longitudinal slot and a recess communicating with the slot into which the lever is adapted to be moved, of a U-shaped locking member adapted to embrace the sides of the lever and having a rigid finger depending through the slot and engaging beneath the plate adjacent the slot, the sides of said U-shaped member having therein a plurality of registering openings adapted to receive the bow of a padlock engaging the lever when in position, and so arranged that the bow of the lock may closely engage levers of varying widths.

2. The combination, with a lever and a slotted guide plate therefor having a longitudinal slot and a recess communicating therewith adapted to receive the lever, of a U-shaped locking member adapted to embrace the lever, a finger rigid with the member adapted to depend through the slot and having a projection on its lower end for engaging beneath the under side of the plate, the sides of said U-shaped member having therein a plurality of openings adapted to receive a lock and arranged as to be in positions at different distances from the side of the lever when the member is in position.

3. The combination, with a gear shift lever and a guide plate therefor having therein a longitudinal slot and a recess adapted to receive the lever and engage its edges, of a locking member for holding said lever in the recess, comprising a clevis-like member having an open side allowing it to be placed on the lever and having a depending finger adapted to engage the sides of the slot, a downwardly extending wedge-shaped projection rigid on the side of the clevis-like member and adapted to engage the slot to prevent lateral movement of the clevis-like member, said clevis-like member having registering openings adapted to receive a lock for engaging a side of the lever.

4. The combination, with a gear shift lever and a guide plate therefor having pairs of longitudinal slots connected by a passage, of means for holding said lever in the passage comprising a member adapted to embrace one edge and two sides of the lever and having openings therein for the bow of a pad-lock adapted to engage the other edge of the lever, said member having rigid depending projections adapted to engage each slot, one of said projections having means engaging beneath the guide plate.

5. The combination, with a gear shift lever and a guide plate therefor having a longitudinal slot and a communicating recess adapted to receive the lever, of a locking member comprising a pair of side members connected at one edge and adapted to embrace the gear shift lever and having a rigid depending finger adapted to engage the sides of the slot and hook beneath and engage the plate adjacent the end of the slot opposite the connecting portion of the locking member, and locking means engaging the side members and the side of the lever opposite the connecting portion.

6. The combination, with a gear shift lever and a guide plate therefor having a longitudinal slot and a communicating recess adapted to receive the lever, of a locking member comprising a pair of side members connected at one edge and adapted to embrace the sides and one edge of the gear shift lever and having a web member extending between the lower edges of the side members adjacent the connecting portion, a rigid depending finger adapted to engage the sides of the slot and hook beneath the plate adjacent the end of the slot, said web member being adapted to engage the side of the lever to prevent the hook being withdrawn, and locking means engaging the side members and the side of the lever opposite the connecting portion.

7. The combination with a gear shift lever and a guide plate therefor having longitudinal slots and a connecting passage communicating with the slots and adapted to receive the lever, of a locking device for holding the lever in this passage comprising a pair of side members integrally connected at one edge and adapted to embrace the lever and extend past the same at one side, openings in the sides to receive a lock engaging the lever to hold the locking member in position, a hooked depending finger extending through one of the slots and engaging beneath the plate, and a depending wedge-shaped member integral with each side member and adapted to engage the slots.

8. The combination, with a gear shift lever and a guide plate therefor having longitudinal slots engaging the lever and a connecting passage communicating with the slots and adapted to receive the lever and centering springs for said lever, of a locking device for holding the lever in this passage comprising a pair of side members rigidly connected at one edge and adapted to embrace the lever, openings in the sides to receive a lock engaging a side of the lever to hold the locking member in position, a depending finger extending through one of the slots and engaging beneath the plate, and depending projections rigid with the side members and adapted to engage the centering springs.

9. The combination, with a gear shift lever and a guide plate therefor having a longitudinal slot and a communicating recess adapted to receive a lever, of a device for holding said lever in the recess comprising a pair of side members rigidly connected at one edge and adapted to embrace an edge and the sides of the lever, said side members having registering openings adapted to receive a lock engaging the other edge of the lever and having a rigid depending finger adapted to extend through one of the slots, said finger having oppositely extending transverse projections at its lower end adapted to engage the plate at each side of the slot.

10. The combination, with a gear shift lever and a guide plate therefor having a longitudinal slot and a passage communicating with the slot adapted to receive the lever, of a device for locking the lever in said passage comprising a pair of side members connected at one edge and adapted to embrace the lever, said side members being wider than the lever and each having a series of openings arranged at different distances from the connecting portion adapted to receive a lock for engaging the side of the lever, said device having a rigid depending member adapted to extend through the slot and engage beneath the under side of the plate.

In testimony whereof, I hereunto affix my signature in the presence of two witnesses.

GEORGE T. TRUNDLE, Jr.

Witnesses:
FRANK A. WIDDOWS,
HERBERT W. EISELE.

Copies of this patent may be obtained for five cents each, by addressing the "Commissioner of Patents, Washington, D. C."